US 8,499,620 B2

(12) United States Patent
Sako et al.

(10) Patent No.: US 8,499,620 B2
(45) Date of Patent: Aug. 6, 2013

(54) GUM SUBSTANCE MONITORING APPARATUS, GUM SUBSTANCE DETECTING METHOD, AND GAS TURBINE SYSTEM

(75) Inventors: Masaaki Sako, Kobe (JP); Hideaki Ota, Ibaraki (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 959 days.

(21) Appl. No.: 12/532,827

(22) PCT Filed: Mar. 30, 2007

(86) PCT No.: PCT/JP2007/057064
§ 371 (c)(1),
(2), (4) Date: Oct. 21, 2009

(87) PCT Pub. No.: WO2008/126242
PCT Pub. Date: Oct. 23, 2008

(65) Prior Publication Data
US 2010/0115952 A1    May 13, 2010

(51) Int. Cl.
*G01N 37/00* (2006.01)
(52) U.S. Cl.
USPC .......................................... 73/64.41
(58) Field of Classification Search
USPC ............................. 73/64.41–64.43
See application file for complete search history.

(56) References Cited

U.S. PATENT DOCUMENTS 2,303,050 A * 11/1942 Jones ............................... 44/457
5,198,871 A *  3/1993 Hill et al. ....................... 356/318
5,317,909 A *  6/1994 Yamada et al. ............. 73/114.39

(Continued)

FOREIGN PATENT DOCUMENTS

JP    59-230090    12/1984
JP    61-065001     4/1986

(Continued)

OTHER PUBLICATIONS

Decision on Grant for Russian Application No. 2009140117, Feb. 1, 2011, 20 pages.

(Continued)

*Primary Examiner* — John Fitzgerald
(74) *Attorney, Agent, or Firm* — Alleman Hall McCoy Russell & Tuttle LLP

(57) ABSTRACT

A gum substance monitoring apparatus for inexpensively and easily estimating and detecting adhesion and deposition of a gum substance produced in a fuel gas onto a combustor and fuel gas supply piping extending to the combustor, includes: detection piping branched from the fuel gas supply piping configured to supply to the combustor with the fuel gas for allowing a part of the fuel gas as a sample gas to pass therethrough; and a gum substance detecting device provided on the detection piping and configured to detect an extent of adhesion of the gum substance produced in the fuel gas, the gum substance detecting device including a simulated passage member having a simulated passage for passage of the sample gas therethrough which is formed by simulating fuel gas piping of the fuel gas supply piping extending in a portion subject to gum substance monitoring which is located downstream of a branch point at which the detection piping is branched from the fuel gas supply piping, the gum substance detecting device being configured to be capable of detecting an extent of adhesion of the gum substance onto the simulated passage member.

19 Claims, 6 Drawing Sheets

(56) References Cited

U.S. PATENT DOCUMENTS

| | | | |
|---|---|---|---|
| 7,450,235 B1 * | 11/2008 | Said et al. | 356/436 |
| 8,347,828 B2 * | 1/2013 | Yoshida et al. | 123/1 A |
| 2013/0019651 A1 * | 1/2013 | Sasaki et al. | 73/1.02 |

FOREIGN PATENT DOCUMENTS

| | | | |
|---|---|---|---|
| JP | 07-333131 | | 12/1995 |
| JP | 2009127433 A | * | 6/2009 |
| RU | 319745 | | 1/1971 |
| RU | 2000458 C | | 9/1993 |
| WO | WO 9303458 A1 | * | 2/1993 |

OTHER PUBLICATIONS

ISA Japan, International Search Report of PCT/JP2007/057064, May 22, 2007, WIPO, 1 page.

\* cited by examiner

GUM SUBSTANCE MONITORING APPARATUS, GUM SUBSTANCE DETECTING METHOD, AND GAS TURBINE SYSTEM

TECHNICAL FIELD

The present invention relates to an apparatus for monitoring a gum substance produced in a fuel gas, a method of detecting such a gum substance, and a gas turbine system provided with the monitoring apparatus. More specifically, the invention relates to an apparatus for monitoring the extent to which a gum substance adheres onto a combustor, fuel gas supply piping, valves, or the like, and a method of detecting the extent of adhesion of the gum substance. Such a gum substance is likely to be produced in a fuel gas when the fuel gas to be fed to a combustor provided in a gas turbine or the like is pressurized. The invention also relates to a gas turbine system provided with such a gum substance monitoring apparatus.

BACKGROUND ART

In ironworks and coke production plants, a coke oven gas (hereinafter will be referred to as "COG" as the case may be) is evolved as a by-product gas during a coke production process in which coal is carbonized. COG is utilized as a fuel for use in ironworks, as city gas, and as a fuel for use in electric power generation systems. COG contains hydrogen and methane as major components, BTX (benzene, toluene and xylene) as volatile components of coal, sulfides, and other components.

When using COG as a fuel for, for example, a gas turbine for use in an electric power generation system, COG is compressed to a high pressure by a compressor before being supplied to the combustor of the gas turbine. When COG is in a high-pressure condition, polymerization reaction is likely to occur between nitrogen oxide (NO) and unsaturated hydrocarbon diener (including butadiene, styrene, cyclopentadiene, and indene), which are trace components of COG, to produce nitrogen oxide gum (NO gum) as a gum substance. Just after having been produced, such a gum substance is an entrained substance comprising fine particles having sizes of about 0.1 μm, which is also called "gas phase gum". Thereafter, the gas phase gum is oxidized and polymerized to produce brown or black adhesive liquid gum.

Such liquid gum (hereinafter will be referred to as "gum substance") adheres and deposits onto fuel gas supply piping extending to the combustor and onto any internal portion of various devices provided on the fuel gas supply piping. It is empirically known that in a gas turbine electric power generation system for example, large amounts of liquid gum are adhered and deposited onto curved internal surfaces of the fuel gas supply piping, internal surfaces of valve casings of valves, internal parts, and internal surfaces of various manifolds and like components. Deposition of a fine dust substance over the gum substance thus adhered and deposited and further deposition of the gum substance over the layers thus stacked, are supposed to occur and repeat. When the gum substance and the dust substance adheres and deposits onto the interiors of the aforementioned piping and devices, the sectional area of the flow passage of the piping is reduced, while the resistance to a movable portion of each of the devices including valves is increased. As a result, an increase in flow passage resistance inside the piping and an operation failure of any one of the valves and combustor are induced, which might forcibly lead to a sudden unexpected emergency stop of the system. As a standard method of detecting the extent of adhesion and deposition of the gum substance has not been established yet, it is impossible to predict the occurrence of an emergency stop of the system caused by deposition of the gum substance.

In cases where COG is used as city gas, when COG is pressurized in order to feed COG to a remote consumer area, the gum substance might be produced and deposited in the same manner as described above.

The followings are known as techniques of limiting the volume of gum substance production from COG or removing the gum substance produced (see patent document 1 also).

(1) NO contained in COG is removed by an iron sulfide method, activated charcoal method, high-pressure silent discharge method, pressurized retention method, or the like. These techniques, however, require large-scale systems and much driving power and, hence, the system investment cost and the running cost become high. Further, the load of maintenance work also becomes heavy. As a result, the fuel purification cost becomes high and the electric power generation cost increases substantially.

(2) COG is intentionally collected within a low-pressure gas storage tank in order to produce the gum substance. The gum substance produced and retained in COG is removed by rinsing, washing or the like. This technique, however, requires a high investment cost because of an extensive installation space and the huge gas storage tank. The running cost is also high because an enormous amount of water is needed. Further, it is not easy to improve the processing ability.

(3) Unsaturated dienes contained in COG are rendered saturated by using an expensive catalyst such as nickel or vanadium. In this technique, when the gum substance is produced in a large amount, the gum substance condenses in micropores of the catalyst to produce high polymeric gum, which rapidly lowers the performance of the catalyst. For this reason, frequent catalyst replacement is needed, which increases the running cost thereby impairing the cost efficiency of electric power generation.

Any one of the above-described processing methods is practiced at a high cost using a high-performance purification system. Even though these methods can remove much of the gum substance, they cannot completely remove the gum substance. Since COG is a gas of which properties are subject to coke production conditions, the production volume and the productions form of gum substance also change. For this reason, in some cases, the gum substance remains in COG even after the purification process.

Therefore, in examining the extent of deposition of the gum substance onto the fuel gas supply piping, the combustor or the like, it is necessary to stop the system operation and disassemble the system for checking visually the interior of the system. And further, while main processes, including the coke production process, are working, by-product gases therefrom continue to be generated. For this reason, it is impractical to stop frequently the gas turbine system and the like in order to inspect predetermined portions. Since effective prior measures cannot be taken, the system must be restored only after an emergency stop of the system has occurred.

Patent Document 1: Japanese Patent Laid-Open Publication No. SHO 59-230090

DISCLOSURE OF THE INVENTION

Problems to be Solved by the Invention

The present invention has been made to solve the foregoing problems. Accordingly, it is an object of the present invention to provide: a monitoring apparatus and a detection method which are capable of inexpensively and easily estimating and detecting adhesion and deposition of the gum substance produced in a fuel gas onto the combustor, fuel gas supply piping extending to the combustor, valves, or the like; and a gas turbine system provided with the monitoring apparatus.

Means for Solving the Problems

A gum substance monitoring apparatus according to the present invention comprises:

a detection passage branched from a fuel gas supply passage configured to supply to a combustor with a fuel gas for allowing a part of the fuel gas as a sample gas to pass therethrough; and a gum substance detecting device provided on the detection passage and configured to detect an extent of adhesion of a gum substance produced in the fuel gas, the gum substance detecting device including a simulated passage member having a simulated passage for passage of the sample gas therethrough, which is formed by simulating a fuel gas passage of the fuel gas supply passage extending in a portion subject to gum substance monitoring, which is located downstream of a branch point at which the detection passage is branched from the fuel gas supply passage, the gum substance detecting device being configured to be capable of detecting an extent of adhesion of the gum substance onto the simulated passage member.

This arrangement is capable of using the sample gas which is identical in composition and condition with the fuel gas and detecting the extent of adhesion and deposition of the gum substance produced in the sample gas. Therefore, it is possible to predict the extent of adhesion and deposition of the gum substance onto a real portion subject to gum substance monitoring and a malfunction due to the adhesion and deposition of the gum substance without a need to disassemble the real portion subject to gum substance monitoring or a like need.

The gum substance detecting device may be provided with a pressure difference detecting device for detecting a pressure difference between an upstream side and a downstream side of the simulated passage member during the passage of the sample gas through the simulated passage. This feature makes it possible to determine the extent of adhesion and deposition of the gum substance onto the simulated passage from a change in pressure difference from detection to detection. (In most cases, the change in pressure difference is an increase in pressure difference.)

It is possible that: the simulated passage member is formed from a material having a light-transmitting property; and the gum substance detecting device is further provided with a transmitted light quantity detecting device for detecting a quantity of light which transmitted through the simulated passage member. This feature makes it possible to determine the extent of adhesion and deposition of the gum substance onto the simulated passage from a change in transmitted light quantity from detection to detection. (In most cases the change in transmitted light quantity is a decrease in light quantity.)

It is possible that: the simulated passage member is constructed removable from the gum substance detecting device; and the gum substance detecting device is further provided with a weight measuring device capable of measuring a change in a weight of the gum substance adhering onto the simulated passage member which is removed from the detecting device. This feature makes it possible to determine the extent of adhesion and deposition of the gum substance onto the simulated passage from the change in weight from detection to detection. (In most cases, the change in weight is an increase in weight). The weight measuring device may be located close to the simulated passage member or in a place at a distance from the measuring site location.

The gum substance monitoring apparatus may further comprise a flow control device provided on the detection passage for controlling a flow rate of the sample gas, the flow control device being configured to be controlled so as to keep a substantially constant ratio between the flow rate of the sample gas fed from the branch point toward the gum substance detecting device and a flow rate of the fuel gas fed from the branch point toward the portion subject to gum substance monitoring. Such an arrangement is preferable because the arrangement can accommodate cases where the rate of fuel supply to the combustor for example is changed and hence is capable of accurately estimating the extent of adhesion and deposition of the gum substance onto the portion subject to gum substance monitoring and a malfunction due to the adhesion and deposition of the gum substance.

The flow control device may be configured to be so controlled that a time period taken for the sample gas to reach to the gum substance detecting device from the branch point and a time period taken for the fuel gas to reach to the portion subject to gum substance monitoring from the branch point become substantially equal to each other. With respect to a gum substance of which the volume of production varies with time, such as NO gum or sulfur oxide gum (SO gum), this feature makes it possible to substantially equalize the condition for formation of the gum substance at the detecting device with the condition for formation of the gum substance at the portion subject to monitoring. Thus, a further improvement can be made in the accuracy with which the extent of adhesion and deposition of the gum substance is estimated.

It is possible that:

the detection passage includes a plurality of detection passages arranged in parallel with each other which are provided with respective flow control devices and respective gum substance detecting devices, the gum substance detecting devices of the respective detection passages being each associated with a respective one of different portions subject to gum substance monitoring; and each of the flow control devices is configured to be so controlled that a time period taken for the sample gas to reach to a respective one of the gum substance detecting devices from the branch point and a time period taken for the fuel gas to reach to that portion subject to gum substance monitoring which is associated with the respective one of the gum substance detecting devices from the branch point become substantially equal to each other.

Such an arrangement is capable of estimating the extents of adhesion and deposition of the gum substance onto each of the different portions subject to gum substance monitoring of the fuel gas supply piping and predicting malfunctions due to the adhesion and deposition of the gum substance at the same time.

The simulated passage may have a sectional shape which is substantially similar to and smaller than a sectional shape of the actual fuel gas passage extending in the portion subject to gum substance monitoring. With this feature, it is possible to effectively and accurately estimate the extent of adhesion and deposition of the gum substance onto the portion subject to gum substance monitoring and predict a malfunction because of the adhesion and deposition of the gum substance.

The gum substance monitoring apparatus may further comprise a control device having stored therein data in which extents of adhesion of the gum substance onto the simulated passage member are related to extents of adhesion of the gum substance onto the portion subject to gum substance monitoring, the control device being configured to provide information about a result of detection by the gum substance detecting device when the result of detection reaches to a predetermined extent of adhesion of the gum substance.

The gum substance monitoring apparatus may further comprise a control device having stored therein data in which extents of adhesion of the gum substance onto the simulated passage member are related to operating conditions of the portion subject to gum substance monitoring, and the control device may be configured to provide information about a result of detection by the gum substance detecting device when the result of detection reaches to a predetermined extent of adhesion of the gum substance.

A gas turbine system according to the present invention comprises:

a fuel gas supply passage configured to supply to a gas turbine with a fuel gas; and a gum substance monitoring apparatus connected to the fuel gas supply passage, the gum substance monitoring apparatus being any one of the gum substance monitoring apparatuses recited above.

It is possible that:

the fuel gas supply passage is provided with a fuel compressor for compressing the fuel gas; and the detection passage has an inlet end connected to a portion of the fuel gas supply passage located downstream of the fuel compressor and an outlet end connected to a portion of the fuel gas supply passage located upstream of the fuel compressor.

It is possible that:

the fuel gas supply passage is provided with a fuel compressor for compressing the fuel gas and a fuel flow control device located downstream of the fuel compressor; and the detection passage has an inlet end connected to a portion of the fuel gas supply passage located upstream of the fuel flow control device and an outlet end connected to a portion of the fuel gas supply passage located downstream of the fuel flow control device.

A gum substance detecting method according to the present invention comprises:

a detection passage preparing step of connecting a detection passage for allowing a part of a fuel gas as a sample gas to pass therethrough to a fuel gas supply passage configured to supply to a combustor with the fuel gas;

a simulated passage forming step of forming in the detection passage a simulated passage for passage of the sample gas therethrough by simulating a fuel gas passage of the fuel gas supply passage extending in a portion subject to gum substance monitoring which is located downstream of a branch point at which the detection passage is branched from the fuel gas supply passage;

a preliminary detection step of detecting an extent of adhesion of a gum substance produced from the sample gas onto the simulated passage during supply of the fuel gas; and a gum substance detecting step of detecting an extent of adhesion of the gum substance produced from the fuel gas onto the portion subject to gum substance monitoring corresponding to the simulated passage, based on the extent of adhesion of the gum substance detected by the preliminary detection step.

It is possible that:

in the preliminary detection step, a pressure difference between an upstream side and a downstream side of a simulated passage member is detected during the passage of the sample gas through the simulated passage; and in the gum substance detecting step, the extent of adhesion of the gum substance onto the portion subject to gum substance monitoring is detected based on the pressure difference detected in the preliminary detection step.

It is possible that:

in the simulated passage forming step, a simulated passage member defining the simulated passage is formed from a material having a light-transmitting property;

in the preliminary detection step, a transmitted light quantity is detected by passing light through the simulated passage member; and in the gum substance detecting step, the extent of adhesion of the gum substance onto the portion subject to gum substance monitoring is detected based on the transmitted light quantity detected by the preliminary detection step.

It is possible that:

in the simulated passage forming step, a simulated passage member defining the simulated passage is constructed removable from the detection passage;

in the preliminary detection step, a change in a weight of the adhering gum substance is detected by measuring a weight of the simulated passage member; and in the gum substance detecting step, the extent of adhesion of the gum substance onto the portion subject to gum substance monitoring is detected based on the change in weight thus detected in the preliminary detection step.

The gum substance detecting method may further comprise:

a first calibration detecting step of detecting extents of adhesion of the gum substance produced from the sample gas onto the simulated passage at time intervals during the supply of the fuel gas, prior to the preliminary detection step;

a second calibration detecting step of detecting an extent of adhesion of the gum substance onto the portion subject to gum substance monitoring corresponding to the simulated passage simultaneously with each of the detections by the first calibration detecting step; and a data processing step of relating results of the detections by the first calibration detecting step to results of the detections by the second calibration detecting step and recording the results thus related to each other as reference detection data, wherein in the gum substance detecting step, the extent of adhesion of the gum substance onto the portion subject to gum substance monitoring which corresponds to the extent of adhesion of the gum substance onto the simulated passage detected by the preliminary detection step is detected by using the reference detection data.

Another gum substance detecting method according to the present invention comprises:

a detection passage preparing step of connecting a detection passage for allowing a part of a fuel gas as a sample gas to pass therethrough to a fuel gas supply passage configured to supply to a combustor with the fuel gas;

a simulated passage forming step of forming in the detection passage a simulated passage for passage of the sample gas therethrough by simulating a fuel gas passage of the fuel gas supply passage extending in a portion subject to gum substance monitoring which is located downstream of a branch point at which the detection passage is branched from the fuel gas supply passage;

a preliminary detection step of detecting an extent of deposition of a gum substance produced from the sample gas onto the simulated passage during supply of the fuel gas;

a first calibration detecting step of detecting extents of adhesion of the gum substance produced from the sample gas onto the simulated passage at time intervals during the supply of the fuel gas, prior to the preliminary detection step;

a third calibration detecting step of detecting a malfunction at the portion subject to gum substance monitoring corresponding to the simulated passage simultaneously with each of the detections by the first calibration detecting step;

a data processing step of relating results of the detections by the first calibration detecting step to results of the detections by the third calibration detecting step and recording the results thus related to each other as reference detection data; and a malfunction detecting step of detecting a malfunction at the portion subject to gum substance monitoring corresponding to the simulated passage, based on the extent of adhesion of the gum substance detected by the preliminary detection step.

Advantages of the Invention

According to the present invention, it is possible to inexpensively and easily estimate and detect adhesion and deposition of the gum substance produced in the fuel gas onto the combustor and the fuel gas supply piping extending to the combustor in a gas turbine system or the like. Thus, it becomes possible to predict a situation in which a sudden unexpected emergency stop of the system is likely, thereby to enable a scheduled operation stop of the system to be executed. As a result, the system can realize a stabilized continuous operation while avoiding a sudden unexpected emergency stop.

BEST MODE FOR CARRYING OUT THE INVENTION

Embodiments of a gum substance monitoring apparatus, a gum substance detecting method and a gas turbine system including the monitoring apparatus according to the present invention will be described with reference to the attached drawings.

Figure 1:
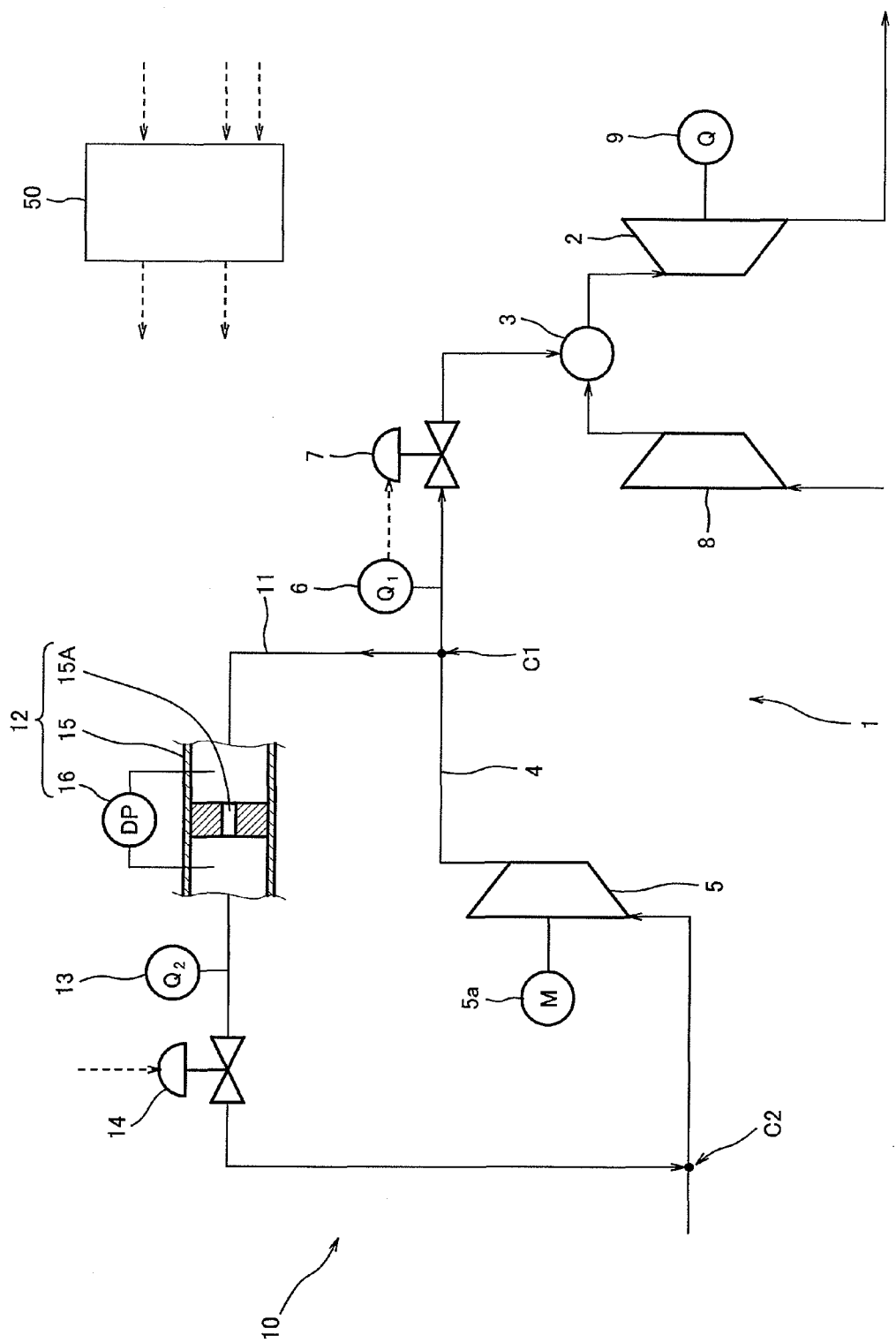
FIG. 1 is a system diagram schematically illustrating a gas turbine electric power generation system including a gum substance monitoring apparatus as one embodiment of the present invention.

FIG. 1 is a system diagram schematically illustrating a gas turbine electric power generation system 1 (hereinafter will be referred to as "electric power generation system 1" simply as the case may be) as one embodiment of a gas turbine system according to the present invention. The electric power generation system 1 includes fuel gas supply piping 4 configured to supply to a combustor 3 of a gas turbine 2 with COG as a fuel gas, a fuel compressor 5 for compressing the fuel gas, a flow rate detecting device 6 for detecting a supply rate of the fuel gas, and a flow control valve 7 for controlling the supply rate of the fuel gas. According to the present embodiment, the fuel compressor 5 may be configured to be driven by a motor 5a, however it may be driven by the gas turbine 2. The flow rate detecting device 6 may be located upstream of the flow control valve 7, or vice versa. In some cases, a non-illustrated unit, such as a dust filter, a simplified fuel processing unit or a fuel purification unit, is provided on the way from a fuel supply source to the fuel compressor 5. An air compressor 8 is connected to the gas turbine 2.

The fuel gas compressed to a high pressure by the fuel compressor 5 is subjected to flow-control by the flow control valve 7 in accordance with the gas turbine load and then mixed with air compressed by the air compressor 8 in the combustor 3 for combustion. The combusted gas drives the gas turbine 2, which in turn causes an electric generator 9 connected thereto to generate electric power.

The electric power generation system 1 has a gum substance monitoring apparatus 10 (hereinafter will be referred to as "monitoring apparatus" simply as the case may be), which is a distinctive feature. The monitoring apparatus 10 serves to estimate and monitor the extent of adhesion and deposition of a gum substance (which is meant to include the amount of adhesion and deposition of the gum substance) probably adhering and depositing onto portions subject to monitoring, including internal surfaces of manifolds and burners (not shown) of the combustor 3 and internal surfaces of the fuel gas supply piping 4, the flow control valve 7 and other various devices. Such estimation makes it possible to predict a situation in which a sudden unexpected emergency stop of the gas turbine 2 is likely to occur, thereby to stop the gas turbine 2 as scheduled; for example, in order to obviate a trouble during operation of electric power generation. Thus, efficient maintenance for restoration of the electric power generation system 1 can be realized.

Portions located downstream of the fuel compressor 5 are selected as the portions subject to monitoring because the gum substance is produced when the gas is in such a high-pressure condition as assumed at the outlet side of a compressor. Therefore, if it is possible that the gum substance is also produced at a portion other than the portions subject to monitoring, such as a portion located upstream of the fuel compressor 5, a monitoring apparatus capable of monitoring such a portion may be provided.

The monitoring apparatus 10 includes gum substance detection piping 11 (hereinafter will be referred to as "detection piping" simply) which connects for communication a portion of the fuel gas supply piping 4 located upstream of the fuel compressor 5 to a portion of the fuel gas supply piping 4 located downstream of the fuel compressor 5 and upstream of all the portions subject to monitoring. The detection piping 11 circulates a part of the fuel gas (hereinafter will be referred to as "sample gas") from the downstream side of the fuel compressor 5, which is a higher pressure side, to the upstream side of the fuel compressor 5. Hereinafter, a connection point at which the detection piping 11 is connected to the portion of the fuel gas supply piping 4 located downstream of the fuel compressor 5 will be referred to as "first connection point (or an inlet of the detection piping 11) C1". A connection point at which the detection piping 11 is connected to the portion of the fuel gas supply piping 4 located upstream of the fuel compressor 5 will be referred to as "second connection point (or an outlet of the detection piping 11) C2".

The detection piping 11 is provided with a gum substance detecting device 12 for detecting the gum substance produced in the sample gas, a flow rate detecting device 13 for detecting the flow rate of the sample gas, and a flow control valve 14 for controlling the flow rate of the sample gas. One of the flow rate detecting device 13 and the flow control valve 14 may be located upstream (or downstream) of the other. A control device 50 is provided which gives instructions to perform various operations including controlling of opening of each of the flow control valves 7 and 14 and giving an alarm based on the result of detection by the gum substance detecting device 12.

The gum substance detecting device 12 comprises a simulated passage member 15 defining a simulated passage 15A simulating the shape of a fuel gas passage extending in a portion subject to monitoring (for example, a burner of the combustor 3), and a differential pressure gauge 16 for detecting the pressure difference between the upstream side and the downstream side of the simulated passage 15A. By detecting the pressure difference between the upstream side and the downstream side of the simulated passage 15A, the extent of adhesion and deposition of the gum substance onto the simulated passage 15A can be estimated. For example, the extent of adhesion and deposition of the gum substance onto the simulated passage 15A is detected based on a pressure difference value increasing with time from a reference value (i.e., initial value) which is a pressure difference value obtained upon the start of operation of the electric power generation system 1. Properly speaking, the extent of adhesion and deposition of the gum substance onto a real portion subject to monitoring should be detected. It is, however, difficult to do so during operation of the electric power generation system and, hence, adhesion of the gum substance onto the simulated passage 15A is detected. Therefore, such detection is, so to speak, preliminary detection (i.e., pilot detection).

The monitoring apparatus 10 monitors the extent of adhesion and deposition of the gum substance onto the portion subject to monitoring. Examples of the portion subject to monitoring include but not limited to amounts of adhesion and deposition that can be expressed as numerical values (including deposition thickness, weight, transmitted light quantity, and sectional area of a gas flow passage). This is because the final purpose of estimation and monitoring is to realize stabilized and efficient electric power generation by predicting a situation in which a sudden unexpected emergency stop of the gas turbine 2 is likely to occur and then effectively making a usual scheduled stop of the gas turbine 2 or taking other measures, as described above. Therefore, adhesion and deposition of the gum substance may be qualitatively evaluated by other values which can effectively serve the final purpose. That is, the time at which an emergency stop will occur can be predicted inexpensively and easily by qualitative evaluation based on an empirical rule that an emergency stop is caused when the condition of adhesion and deposition of the gum substance reaches to a certain level. Therefore, the gum substance detecting device 12 also may be configured to detect adhesion and deposition of the gum substance by qualitative evaluation. In short, any manner of estimation or evaluation can serve the purpose as long as it is related to the extent of adhesion and deposition of the gum substance onto the portion subject to monitoring.

It is most desirable that: the simulated passage 15A will be identical in shape and dimensions and in surface properties with a fuel gas passage extending in a real portion subject to monitoring; and the detection piping 11 will be completely identical in the flow passage sectional shape, the length from the first connection point C1 to the simulated passage 15A, the piping shape and the like with a portion of the fuel gas supply piping 4 extending from the first connection point C1 to the portion subject to monitoring. Additionally, by making the flow rate or the like of the sample gas equal to that of the fuel gas in the portion subject monitoring, accurate prediction becomes possible from the result of detection by the gum substance detecting device 12. From the viewpoint of cost efficiency and the like, however, it is impractical to circulate about a half amount of total supply of the fuel gas to the monitoring apparatus 10 during operation. For this reason, the shape and dimensions of each portion of the monitoring apparatus 10, as well as the gas flow rate and gas pressure in the monitoring apparatus 10, are preferably not identical with the corresponding ones but are made similar to the corresponding ones by reduction. The portion of the monitoring apparatus 10 which corresponds to the portion subject to monitoring may have a simple geometric shape unlike the portion subject to monitoring, as will be described later.

It is also important that the pressure and temperature of the sample gas are made substantially equal to those of the fuel gas in the fuel gas supply piping 4. For this purpose, the detection piping 11 may be provided with a pressure control device, a temperature control device, a temperature detecting device, a pressure detecting device, or the like.

By detecting the extent of adhesion and deposition of the gum substance onto the simulated passage 15A, the extent of adhesion and deposition of the gum substance onto the portion subject to monitoring at the time of detection is estimated. Based on thus estimated extent of adhesion and deposition of the gum substance onto the portion subject to monitoring, it is judged whether or not an operation stop is necessary and/or it is determined when the operation must be stopped. When it is necessary to stop the operation, an operation stop schedule and the like are determined.

It is preferable to make adjustment such that the time period taken for the sample gas to reach to the gum substance detecting device 12 from the inlet C1 of the detection piping 11 becomes substantially equal to the time period taken for the fuel gas to reach to the portion subject to monitoring from the inlet C1 of the detection piping 11. This is because the gum substance, which is produced in the gas in a high pressure condition, varies in its amount with the lapse of time and, hence, the accumulated amount of the gum substance differs according to the time elapsed from the moment when the gas passes through the outlet of the fuel compressor 5 pressurizing the gas to a high pressure. Even when the properties of the fuel gas, including the composition, fluctuate, an adhering and depositing simulation condition being identical with the real condition under which the gum substance adheres and deposits onto such a portion subject to monitoring as the burner of the combustor appears in the simulated passage 15A of the gum substance detecting device 12, so long as the divided gas flow having the same properties will reach to respective of the gum substance detecting device 12 and to the corresponding portion subject to monitoring at the same time (i.e., at the same elapsed time). As a result, the prediction accuracy of the extent of adhesion and deposition of the gum substance onto the portion subject to monitoring is improved.

For this purpose, gas flow rates are respectively detected by the flow rate detecting device 6 provided on the fuel gas supply piping 4 and by the flow rate detecting device 13 provided on the detection piping 11. The time period taken for the gas to reach the portion subject to monitoring from the detection piping inlet C1 is calculated by dividing the flow rate of the gas in the fuel gas supply piping 4 by the internal volume of the portion of the fuel gas supply piping extending from the detection piping inlet C1 to the portion subject to monitoring. Similarly, the time period taken for the gas to reach to the gum substance detecting device 12 from the detection piping inlet C1 is calculated by dividing the flow rate of the gas in the detection piping 11 by the internal volume of the detection piping 11 extending from the detection piping inlet C1 to the gum substance detecting device 12. The opening of the flow control valve 14 provided on the detection piping 11 is so controlled that these time periods become substantially equal to each other. That is, a control is so performed that the flow rate ratio between the fuel gas and the sample gas is kept at a predetermined value. Such a control is achieved by the control device 50 which transmits a target opening signal to the flow control valve 14 on the detection piping 11 in response to a detection signal from the flow rate detecting device 6 on the fuel gas supply piping 4 and then feedback-controls the flow control valve 14 based on a detection signal from the flow rate detecting device 13.

By thus controlling, it is possible to accurately predict the extent of adhesion and deposition of the gum substance onto the portion subject to monitoring even when the rate of fuel gas supply to the combustor 3 fluctuates along with fluctuations of the gas turbine load. The flow control device of the detection piping 11 may comprise a fixed orifice, a manual throttle valve, or the like instead of the flow control valve 14 depending on the fuel gas supply conditions (for example, on such a condition that the supply flow rate does not vary).

Figure 2:
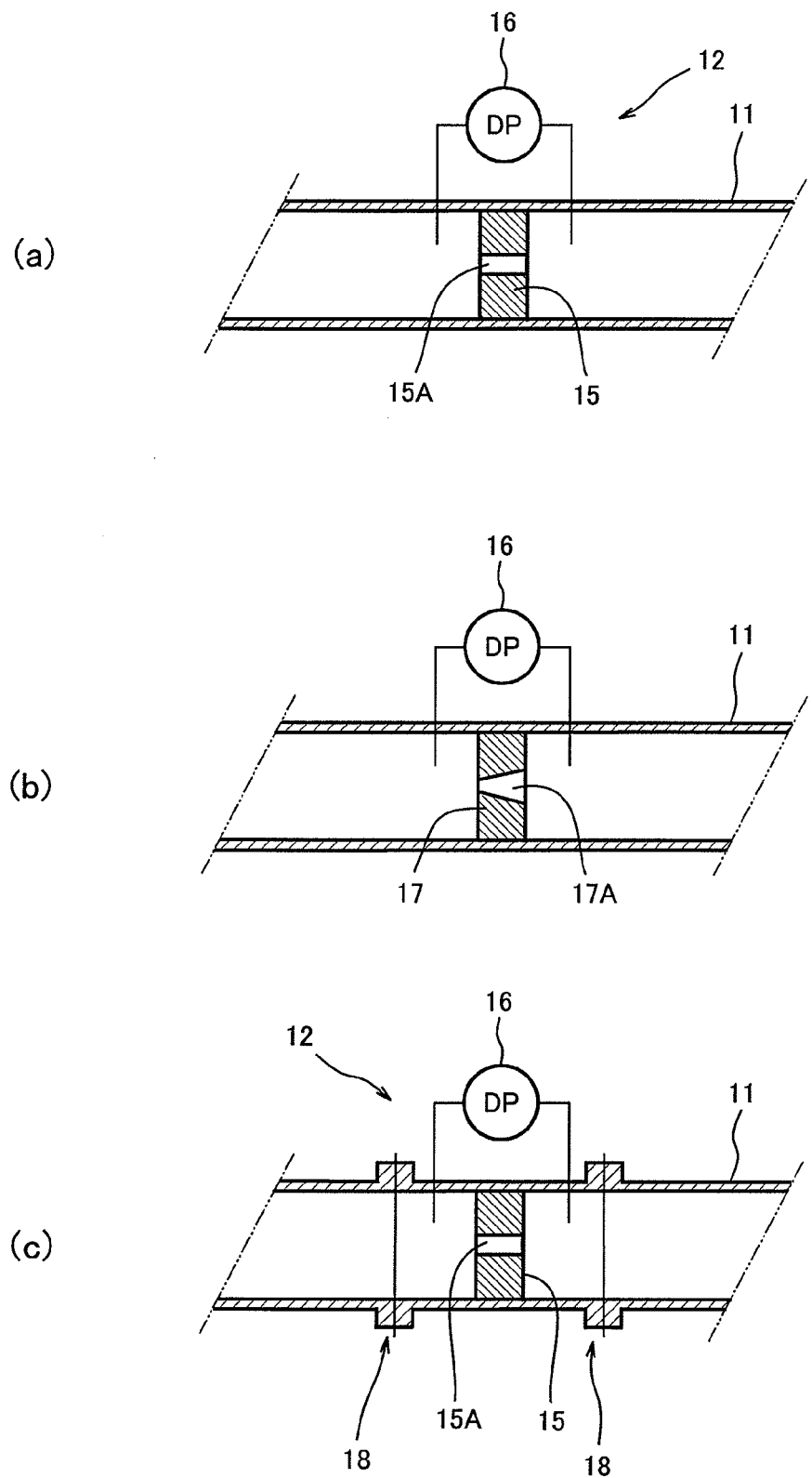
FIGS. 2(a) to 2(c) are each a sectional view illustrating an exemplary gum substance detecting device included in the gas turbine electric power generation system illustrated in FIG. 1.

FIG. 2 illustrates various forms of the simulated passage. A gum substance detecting device illustrated in FIG. 2(a) has a simulated passage member 15 located inside the detection piping 11. A simulated passage 15A has a flow passage with a constant sectional area as it extends in the flow direction. Similarly, a gum substance detecting device illustrated in FIG. 2(b) has a simulated passage member 17 located inside the detection piping 11. However, a simulated passage 17A illustrated in FIG. 2(b) has a flow passage with a decreasing sectional area as it extends toward the downstream side in the flow direction. The flow passage shape of the simulated passage 17A simulates a feature causing a pressure loss by a simple technique because a flow passage in a real combustor or valve has a non-uniform shape which causes a flow passage resistance to occur. Of course, it is possible to apply a simulated passage having a flow passage with an increasing sectional area as it extends toward the downstream side in the flow direction, when necessary. Though not illustrated, any one of the flow passages of these simulated passages has a circular sectional shape. However, any other shape may be employed as a sectional shape of the flow passage.

The gum substance detecting device 12 is preferably configured to be removable from the detection piping 11 by using a flange joint or the like, as shown in FIG. 2(c). In this case, non-illustrated stop valves are provided on the opposite outer sides of flange portions 18 located at the inlet and the outlet of the gum substance detecting device 12. If a plurality of simulated passage members having different simulated passage shapes are provided, replacement of a simulated passage member with another one is possible as an occasion arises, for example, changing the portion subject to monitoring. The entire gum substance detecting device 12 inclusive of the differential pressure gauge 16 need not necessarily be configured to be removable, but only the simulated passage member 15 exclusive of the differential pressure gauge 16 may be configured to be removable.

Instead of detecting the pressure difference between the upstream side and the downstream side of the simulated passage member 15, a non-illustrated weight measuring device may be provided for measuring the weight of the simulated passage member 15 in a state of having been removed from the detection piping 11 whenever necessary, thereby detecting the extent of adhesion and deposition of the gum substance based on an increase in weight. The weight measuring device may be located close to the simulated passage member 15 or installed in a separate room for various inspections (an inspection room or the like). Alternatively, the weight measuring device may be positioned to support the weight of the simulated passage member 15 in order to measure automatically the weight of the simulated passage member 15 when the opposite ends of the simulated passage member 15 are detached from the detection piping 11.

It is possible to visually check the internal surface of the simulated passage 15A of the simulated passage member 15 after removing from the detection piping 11. It is also possible that: the simulated passage member 15 is formed from a material having a light-transmitting property; and the simulated passage member 15 is applied with light having a constant light intensity throughout every application to measure the quantity of light transversely transmitted through the simulated passage 15A. The extent of adhesion and deposition of the gum substance can be detected based on a decrease in transmitted light quantity.

Figure 3:
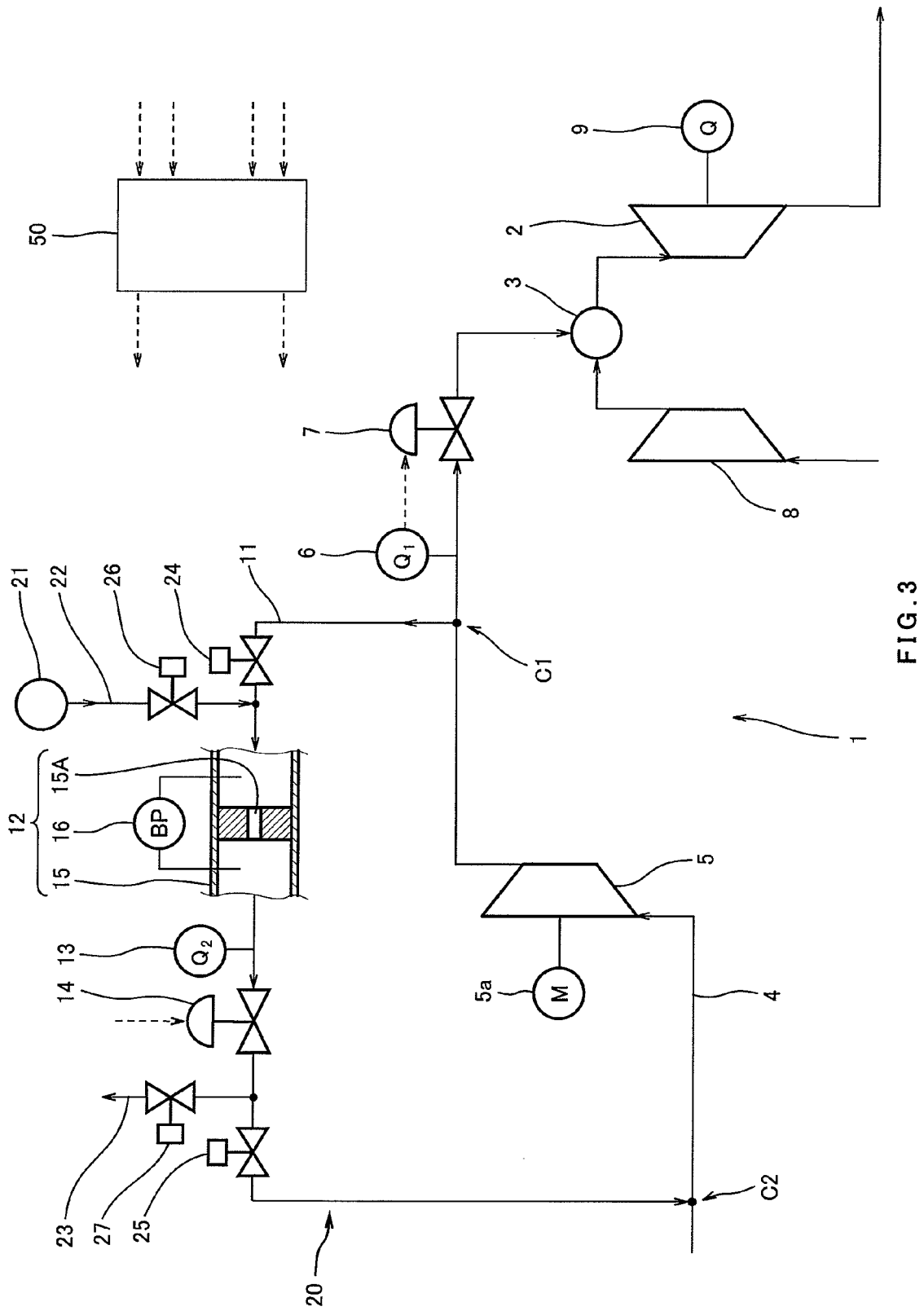
FIG. 3 is a system diagram schematically illustrating a gas turbine electric power generation system including a gum substance monitoring apparatus as another embodiment of the present invention.

A monitoring apparatus 20 illustrated in FIG. 3 is configured to allow a checking gas to pass therein for checking the function of the monitoring apparatus 10 illustrated in FIG. 1. Like reference characters are used to designate like components throughout FIGS. 1 and 3 in order to omit description thereof Checking gas supply piping 22 extending from a checking gas supply source 21 is connected to a portion of the detection piping 11 located upstream of the gum substance detecting device 12, while checking gas discharge piping 23 connected to a portion of the detection piping 11 located downstream of the flow rate detecting device 13 and flow control valve 14. The checking gas supply piping 22 and the checking gas discharge piping 23 are provided with stop valves 24 and 25, respectively. A portion of the detection piping 11 located upstream of a point at which the checking gas supply piping 22 is connected to the detection piping 11 and a portion of the detection piping 11 located downstream of a point at which the checking gas discharge piping 23 is connected to the detection piping 11, are provided with stop valves 26 and 27, respectively.

At occasions, such as after installation of the monitoring apparatus 20, before operation, and after restoration work by cleaning of the simulated passage 15A, the checking gas is passed through the gum substance detecting device 12 in order to check the soundness of the function of the gum substance detecting device 12 and determine a reference detected value related to the gum substance in the simulated passage 15A (for example, the pressure difference between the upstream side and the downstream side of the simulated passage 15A). Specifically, the stop valves 26 and 27 of the checking gas piping 22 and checking gas piping 23 are opened while the stop valves 24 and 25 of the detection piping 11 are closed to introduce the checking gas from the checking gas supply source 21 into the gum substance detecting device 12 and then discharge the checking gas through the checking gas discharge piping 23. During normal operation of the electric power generation system 1, on the other hand, the stop valves 26 and 27 of the checking gas piping 22 and checking gas piping 23 are closed, while the stop valves 24 and 25 of the detection piping 11 are opened.

Figure 4:
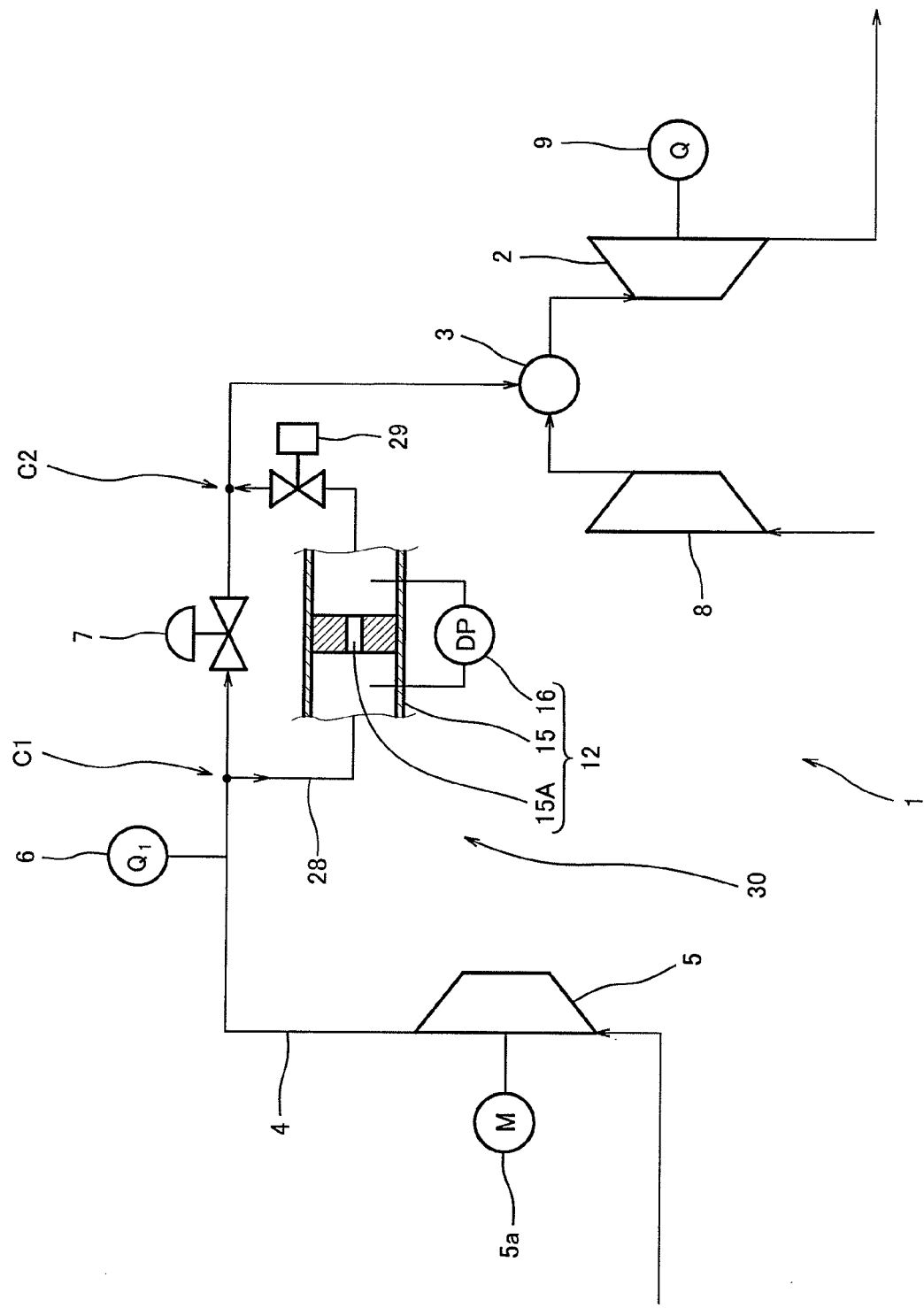
FIG. 4 is a system diagram schematically illustrating a gas turbine electric power generation system including a gum substance monitoring apparatus as yet another embodiment of the present invention.

Fuel gas supply piping 4 of the electric power generation system 1 illustrated in FIG. 4 is provided with a monitoring apparatus 30 connected in parallel with the flow control valve 7 for monitoring the flow control valve 7 as the portion subject to monitoring. Like reference characters are used to designate like components throughout FIGS. 1 and 4 in order to omit description thereof. Though only the flow control valve 7 is illustrated as an exemplary portion subject to monitoring in FIG. 4, a similar monitoring apparatus may be provided in parallel with any other portion subject to monitoring (for example, the burners (not shown) of the combustor 3, a bent portion of the fuel gas supply piping 4, or a flow passage portion of any one of various devices or piping members). The monitoring apparatus 30 has detection piping 28 connected to a portion of the fuel gas supply piping 4 located upstream of the flow control valve 7 (i.e., inlet C1) and to a portion of the fuel gas supply piping 4 located downstream of the flow control valve 7 (i.e., outlet C2) so as to bypass the flow control valve 7. The detection piping 28 is provided with the same gum substance detecting device 12 as shown in FIG. 1. The detection piping 28 is further provided with a shut-off valve 29.

Since the gum substance detecting device 12 is disposed close to and in parallel with the portion subject to monitoring (i.e., flow control valve 7), this arrangement may be very preferable for monitoring the condition of adhesion and deposition of the gum substance onto the portion subject to monitoring. This is because the pressure difference between the upstream side and the downstream side of the flow control valve 7 is equal to that between the upstream side and the downstream side of the gum substance detecting device 12 (i.e., the pressure difference between the inlet C1 and the outlet C2). Further, the shape and gas flow condition of a flow passage extending from the fuel compressor 5 to the flow control valve 7 are substantially identical with the shape and gas flow condition of a flow passage extending from the fuel compressor 5 to the gum substance detecting device 12. Therefore, the simulated passage 15A of the gum substance detecting device 12 has accurately simulated the flow passage of the flow control valve 7.

Upon start of steady operation of the gas turbine 2, the shut-off valve 29 is opened to cause the gum substance detecting device 12 to start functioning. At that time, the flow control valve 7 reduces the flow rate of the fuel gas passing therethrough by an amount equal to the flow rate of the fuel gas passing through the shut-off valve 29, in a manner linked with the operation of the shut-off valve 29, so that the flow rate of the fuel gas to be supplied to the combustor 3 may be controlled to keep a given value.

Figure 5:
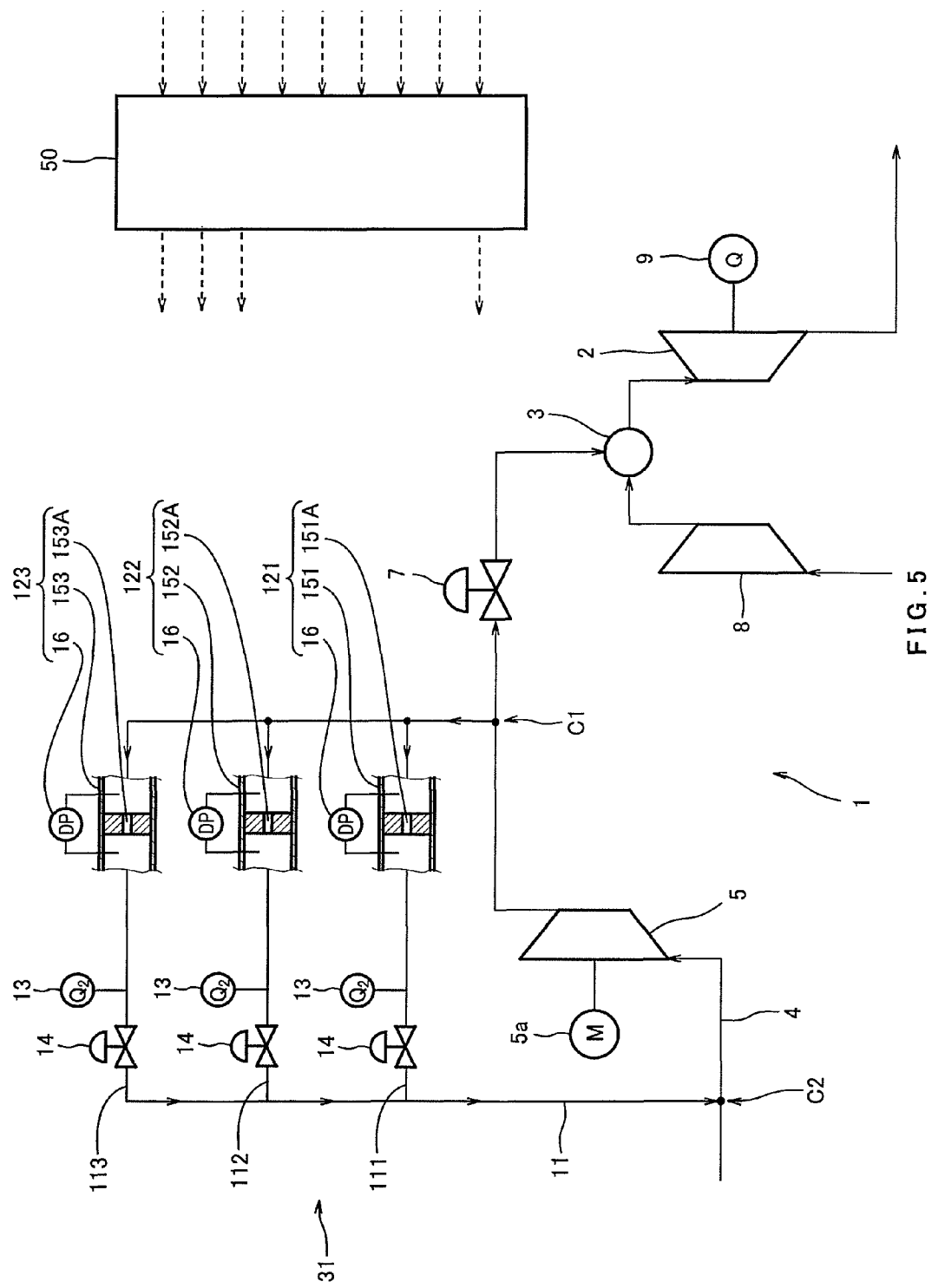
FIG. 5 is a system diagram schematically illustrating a gas turbine electric power generation system including a gum substance monitoring apparatus as yet another embodiment of the present invention.

The electric power generation system 1 illustrated in FIG. 5 includes an monitoring apparatus 31 in which a plurality of gum substance detecting devices 12 each associated with a respective one of plural portions subject to monitoring are arranged in parallel. Specifically, detection piping 11 is connected to the fuel gas supply piping 4 so as to provide communication between respective portions of the fuel gas supply piping 4 located upstream and downstream of the fuel gas compressor 5. The detection piping 11 branches into plural branch lines (three branch lines in this embodiment) at intermediate points which are joined together at a point near before the second connection point C2. The branch lines 111, 112 and 113 are each provided with a respective one of gum substance detecting device 121, 122 and 123, a respective one of flow rate detecting devices 13 and a respective one of flow control valves 14. Each of the gum substance detecting devices 121, 122 and 123 has a respective one of simulated passage members 151, 152 and 153 defining respective simulated passages 151A, 152A and 153A, and a respective one of differential pressure gauges 16.

Each of the simulated passages 151A, 152A and 153A has a flow passage shape simulating the flow passage shape of an associated one of the portions subject to monitoring. For example, each simulated passage may have a sectional shape which is similar to and smaller than the sectional shape of the flow passage extending in the associated one of the portions subject to monitoring. The length, the sectional flow passage shape, the piping shape and the like of a portion of the detection piping 11 (inclusive of the portion extending from the first connection point C1 to each of the simulated passages 111, 112 and 113, and an associated one of the branch lines 111, 112 and 113) have simulated the length, the sectional flow passage shape, the piping shape and the like of the portion of the fuel gas supply piping 4 extending from the first connection point C1 to each of the portions subject to monitoring. (The portion of the detection piping 11 and the portion of the fuel gas supply piping 4 may be made similar in length and shape to each other for example.) The flow control valve 14 performs a control such that the time period taken for the sample gas to reach to each of the gum substance detecting devices 121, 122 and 123 from the first connection point C1 is made substantially equal to the time period taken for the fuel gas to reach to the associated one of the portions subject to monitoring from the first connection point C1. As a result, the extent of adhesion of the gum substance onto each portion subject to monitoring can be predicted accurately.

Description will be made hereunder of an exemplary gum substance detecting method using the monitoring apparatus described above. Described first is an exemplary method of collecting data in which results of detection by the gum substance detecting device 12 are related to extents of adhesion and deposition of the gum substance onto the portion subject to monitoring.

During a test run of the gas turbine electric power generation system 1, the gas turbine electric power generation system 1 is stopped plural times at time intervals as scheduled for system checking. The time intervals can be set as desired. For example, the electric power generation system 1 may usually be stopped after lapses of 500, 2,500 and 5,000 hours from the start of the test run of the electric power generation system 1. Scheduled stopping at time intervals as the above is generally practiced. At each scheduled stop, recording is made of the result of detection by the gum substance detecting device 12 (such as pressure difference, weight or transmitted light quantity detected, results of visual inspection, or others) and the extent of adhesion of the gum substance onto the simulated passage 15A of the gum substance detecting device 12. Further, the portion subject to monitoring corresponding to the gum substance detecting device 12 is disassembled and, then, the extent of adhesion and deposition of the gum substance is observed. The result of observation is related to the result of detection by the gum substance detecting device 12 and then recorded. These works are repeated at scheduled stop in order to process data which serve as criteria for judgment on a scheduled operation stop.

The time intervals between scheduled stops can be set as desired and are not limited to the time intervals noted above. The time intervals may be set shorter for the data collection in particular. For example, the electric power generation system 1 is stopped after lapses of 24, 48, 100 and 500 hours from the start of the test run. Based on checking results at scheduled stops after lapses of such short time periods from the start of the test run, the time intervals between later scheduled stops may be modified.

As described above, the contents to be recorded are not limited to quantitative contents such as a pressure difference value and others. This is because quantitative detection is difficult in some cases and because even a record of qualitative contents can serve the purpose of predicting the extent of adhesion and deposition of the gum substance onto the portion subject to monitoring so long as the result of detection by the gum substance detecting device 12 can explain well about the relation between the extents of adhesion of the gum substance onto the simulated passage 15A and the extents of the same onto the portion subject to monitoring.

The following description explains the operation of relating the extent of adhesion of the gum substance onto the portion subject to monitoring to conditions for an operation stop of the electric power generation system 1. From the extent of adhesion of the gum substance onto the portion subject to monitoring detected at the time of disassembly and checking, it is possible to theoretically calculate and decide whether or not an operation failure of any one of the valves or an operation failure of the burner of the combustor will occur. For example, it is possible to calculate either the sliding resistance value of the valve stem of a valve from the location and thickness of the gum substance adhering or the gas flow resistance value or the like of a burner nozzle from a decrease in flow passage area due to adhesion of the gum substance and then judge whether or not such a calculated value can cause an operation failure to occur, thereby to decide whether or not to stop the operation of the system.

Since the condition of adhesion of the gum substance onto the portion subject to monitoring is related to the corresponding result of detection by the gum substance detecting device 12, the necessity of an operation stop can be judged from the result of detection by the gum substance detecting device 12. If the records of checks made after respective emergency stops that occurred suddenly during normal operations (including commercial operations) of the electric power generation system 1 in the past are previously marshaled, existing data can be appropriately modified based on the marshaled records of checks, thereby improving the reliability of data serving as criteria for judgment on an operation stop.

The control device 50 has stored therein data in which the results of detection by the gum substance detecting device 12 are thus related to the conditions for the operation stop of the electric power generation system 1. Based on the data, an allowable value for providing information about the necessity of a scheduled stop of the electric power generation system 1 (for example, an allowable pressure difference between the upstream side and the downstream side of the simulated passage 15A) is established in relation to a value detected by the gum substance detecting device 12 and then stored in the control device 50. Such an allowable value is preferably a value obtained by adding a safety margin to a value causing an actual emergency stop of the electric power generation system 1.

Figure 6:
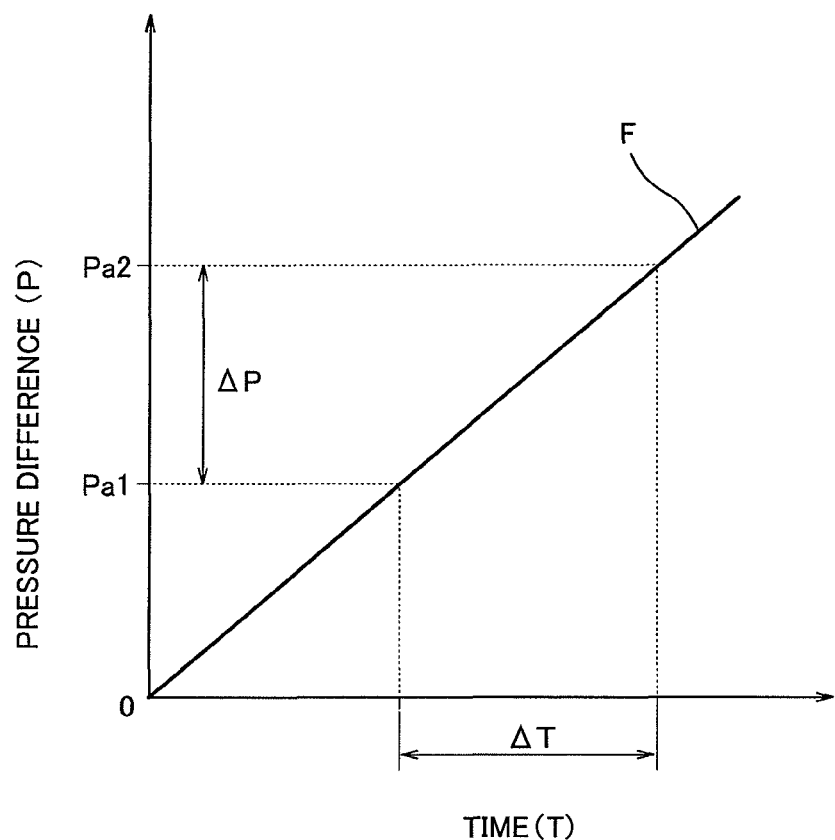
FIG. 6 is a graph schematically illustrating an exemplary relationship between the result of detection by a gum substance monitoring apparatus according to the present invention and a scheduled operation stop of a gas turbine electric power generation system.

FIG. 6 shows an exemplary relationship between the result of detection by the gum substance detecting device 12 and the condition for an operation stop of the electric power generation system 1 as a linear function. In FIG. 6, the horizontal axis represents the operating time (T) of the gas turbine 2 and the vertical axis represents the value detected by the gum substance detecting device 12 (i.e., the pressure difference P between the upstream side and the downstream side of the simulated passage 15A in the present embodiment). For example, the operation start of the gas turbine 2 is regarded as the origin, that is, P=0 when T=0. Pa2 in FIG. 6 is a pressure difference value which is determined from an advice from the system maker or the like, a theoretically calculated value, an empirical value, and the like and at which a scheduled stop of the electric power generation system 1 is necessary for avoiding a sudden emergency stop. Pa1 in FIG. 6 is a value obtained by subtracting a pressure difference change $\Delta P$ (equivalent to a margin of safety) during a predetermined time period $\Delta T$ (Pa1=Pa2-$\Delta P$). When the detected value reaches Pa1, an alarm for example is issued for hastening decision on the timing of a scheduled stop of the electric power generation system 1. The time period $\Delta T$ corresponding to $\Delta P$ is determined in view of the operating condition of a main processing system generating a by-product gas to be used as a fuel, a current electric power demand, and the like. It is safe from the viewpoint of operation that the operation of the system is stopped by allowing a safety margin at a time considerably earlier than a predicted time at which an emergency stop will occur. However, such a considerably earlier stop leads to frequent stops and hence is not advisable from the viewpoint of operation efficiency. For this reason, the time period $\Delta T$ allowed until the scheduled stop is preferably established in view of the operating condition of each system.

In FIG. 6, the exemplary relationship between the operating time of the gas turbine 2 and the result of detection by the gum substance detecting device 12 is shown as a simple linear function. The straight line F in FIG. 6, which is a linear function, is variable depending on various factors. (Namely, the angle of inclination of the straight line F may vary.) For example, the linear function is variable depending on several factors, the configuration of the gas turbine electric power generation system, the environmental condition under which the system is used, the properties of the by-product gas as a gas turbine fuel, the properties and formation condition of the gum substance, the material and surface properties of the fuel gas supply piping, and the like. In some cases, the increase rate of deposition of the gum substance varies with time, and thereby the function F takes a different form.

While the gas turbine electric generation system has been illustrated in the foregoing embodiment, the present invention is not limited thereto. The present invention can also be suitably applied to a gas turbine system not intended for electric power generation, for example, a gas turbine system configured to provide to a general machine system with power. The present invention is applicable to a gas turbine including a combustor of any type. Further, the present invention is applicable to other driving systems such as an internal combustion engine and a boiler without limitation to a gas turbine system. In short, the present invention is applicable to various systems using fuel gases from which the gum substance can be produced. The gum substance is not particularly limited to NO gum, but may be a adhesive substance such as sulfur gum. The fuel gas which can produce the gum substance is not particularly limited to COG The present invention is applicable to any piping or device which allows passage of a gas that can produce a adhesive substance, for example, a process off-gas comprising $C_1$ or $C_2$ as a major component, LPG, pyrolysis gas produced from biomass gas, or the like. Since some by-product gases produced by petroleum refining contain dienes (such as butadiene, cyclopentadiene and the like), NO, $O_2$ and the like and hence can produce NO gum when compressed, the present invention is also applicable to such gases.

At the time when a by-product gas is produced, an adhesive substance, such as tar, may be present as one component thereof. Such a substance can be removed by a purification system provided upstream of a fuel gas supply passage. By using a simple technique like the foregoing embodiment, however, it is possible to predict the occurrence of a sudden unexpected emergency stop of a gas turbine, thereby to avoid the emergency stop without providing such an expensive purification system.

It will be apparent from the foregoing description that various variations and embodiments of the present invention may occur to those skilled in the art. Therefore, the foregoing description should be construed as an illustration in connection with the drawings and is provided for the purpose of teaching those skilled in the art to become able to carry out the present invention. The details of the structure and function having been described above can be practiced by being substantially and variously varied without departing from the spirit of the present invention. It should be understood that such variations fall within the scope of the present invention.

INDUSTRIAL APPLICABILITY

The gum substance monitoring apparatus according to the present invention is capable of inexpensively and easily estimating and detecting the extent of adhesion and deposition of a gum substance produced in a fuel gas onto piping and devices and hence is useful in a combustion system and a like system which use gases that can produce gum substances such as COG.

The invention claimed is:

1. A gum substance monitoring apparatus comprising:
    a detection passage branched from a fuel gas supply passage configured to supply to a combustor with a fuel gas for allowing a part of the fuel gas as a sample gas to pass therethrough; and
    a gum substance detecting device provided on said detection passage and configured to detect an extent of adhesion of a gum substance produced in the fuel gas,
    said gum substance detecting device including a simulated passage member having a simulated passage for passage of the sample gas therethrough, which is formed by simulating a fuel gas passage of said fuel gas supply passage extending in a portion subject to gum substance monitoring, which is located downstream of a branch point at which said detection passage is branched from said fuel gas supply passage, said gum substance detecting device being configured to be capable of detecting an extent of adhesion of the gum substance onto said simulated passage member.

2. The gum substance monitoring apparatus according to claim 1, wherein said gum substance detecting device is provided with a pressure difference detecting device for detecting a pressure difference between an upstream side and a downstream side of said simulated passage member during the passage of the sample gas through said simulated passage.

3. The gum substance monitoring apparatus according to claim 1, wherein: said simulated passage member is formed from a material having a light-transmitting property; and said gum substance detecting device is further provided with a transmitted light quantity detecting device for detecting a quantity of light transmitting through said simulated passage member.

4. The gum substance monitoring apparatus according to claim 1, wherein: said simulated passage member is constructed to be removable from said gum substance detecting device; and said gum substance detecting device is further provided with a weight measuring device capable of measuring a change in a weight of the gum substance adhering onto said simulated passage member in a removed state.

5. The gum substance monitoring apparatus according to claim 1, wherein said simulated passage has a sectional shape which is substantially similar to and smaller than a sectional shape of said fuel gas passage extending in said portion subject to gum substance monitoring.

6. The gum substance monitoring apparatus according to claim 1, further comprising a control device having stored therein data in which extents of adhesion of the gum substance onto said simulated passage member are related to extents of adhesion of the gum substance onto said portion subject to gum substance monitoring, the control device being configured to provide information about a result of detection by said gum substance detecting device when the result of detection reaches to a predetermined extent of adhesion of the gum substance.

7. The gum substance monitoring apparatus according to claim 1, further comprising a control device having stored therein data in which extents of adhesion of the gum substance onto said simulated passage member are related to operating conditions of said portion subject to gum substance monitoring, the control device being configured to provide information about a result of detection by said gum substance detecting device when the result of detection reaches to a predetermined extent of adhesion of the gum substance.

8. The gum substance monitoring apparatus according to claim 1, further comprising a flow control device provided on said detection passage for controlling a flow rate of the sample gas,
    said flow control device being configured to be controlled so as to keep a substantially constant ratio between the flow rate of the sample gas fed from said branch point toward said gum substance detecting device and a flow rate of the fuel gas fed from said branch point toward said portion subject to gum substance monitoring.

9. The gum substance monitoring apparatus according to claim 8, wherein said flow control device is configured to be so controlled that a time period taken for the sample gas to reach to said gum substance detecting device from said branch point and a time period taken for the fuel gas to reach to said portion subject to gum substance monitoring from said branch point become substantially equal to each other.

10. The gum substance monitoring apparatus according to claim 9, wherein:
    said detection passage includes a plurality of detection passages arranged in parallel with each other which are provided with respective flow control devices and respective gum substance detecting devices, the gum substance detecting devices of respective of said detection passages being each associated with a respective one of different portions subject to gum substance monitoring; and
    each of said flow control devices is configured to be so controlled that a time period taken for the sample gas to reach to a respective one of said gum substance detecting devices from said branch point and a time period taken for the fuel gas to reach to that portion subject to gum substance monitoring which is associated with said respective one of said gum substance detecting devices from said branch point become substantially equal to each other.

11. A gas turbine system comprising:
    a fuel gas supply passage configured to supply to a gas turbine with a fuel gas; and
    a gum substance monitoring apparatus connected to said fuel gas supply passage,
    said gum substance monitoring apparatus comprising a detection passage branched from a fuel gas supply passage configured to supply to a combustor with a fuel gas for allowing a part of the fuel gas as a sample gas to pass therethrough; and a gum substance detecting device provided on said detection passage and configured to detect an extent of adhesion of a gum substance produced in the fuel gas, said gum substance detecting device including a simulated passage member having a simulated passage for passage of the sample gas therethrough, which is formed by simulating a fuel gas passage of said fuel gas supply passage extending in a portion subject to gum substance monitoring, which is located downstream of a branch point at which said detection passage is branched from said fuel gas supply passage, said gum substance detecting device being configured to be capable of detecting an extent of adhesion of the gum substance onto said simulated passage member.

12. The gas turbine system according to claim 11, wherein:
said fuel gas supply passage is provided with a fuel compressor for compressing the fuel gas; and
said detection passage has an inlet end connected to a portion of said fuel gas supply passage located downstream of said fuel compressor and an outlet end connected to a portion of said fuel gas supply passage located upstream of said fuel compressor.

13. The gas turbine system according to claim 11, wherein:
said fuel gas supply passage is provided with a fuel compressor for compressing the fuel gas and a fuel flow control device located downstream of said fuel compressor; and
said detection passage has an inlet end connected to a portion of said fuel gas supply passage located upstream of said fuel flow control device and an outlet end connected to a portion of said fuel gas supply passage located downstream of said fuel flow control device.

14. A gum substance detecting method comprising:
a detection passage preparing step of connecting a detection passage for allowing a part of a fuel gas as a sample gas to pass therethrough to a fuel gas supply passage configured to supply to a combustor with the fuel gas;
a simulated passage forming step of forming in said detection passage a simulated passage for passage of the sample gas therethrough by simulating a fuel gas passage of said fuel gas supply passage extending in a portion subject to gum substance monitoring which is located downstream of a branch point at which said detection passage is branched from said fuel gas supply passage;
a preliminary detection step of detecting an extent of adhesion of a gum substance produced from said sample gas onto said simulated passage during supply of the fuel gas; and
a gum substance detecting step of detecting an extent of adhesion of the gum substance produced from the fuel gas onto said portion subject to gum substance monitoring corresponding to said simulated passage, based on the extent of adhesion of the gum substance detected by said preliminary detection step.

15. The gum substance detecting method according to claim 14, wherein:
in said preliminary detection step, a pressure difference between an upstream side and a downstream side of a simulated passage member is detected during the passage of the sample gas through said simulated passage; and
in said gum substance detecting step, the extent of adhesion of the gum substance onto said portion subject to gum substance monitoring is detected based on the pressure difference detected in said preliminary detection step.

16. The gum substance detecting method according to claim 14, wherein:
in said simulated passage forming step, a simulated passage member defining said simulated passage is formed from a material having a light-transmitting property;
in said preliminary detection step, a transmitted light quantity is detected by passing light through said simulated passage member; and
in said gum substance detecting step, the extent of adhesion of the gum substance onto said portion subject to gum substance monitoring is detected based on the transmitted light quantity detected in the preliminary detection step.

17. The gum substance detecting method according to claim 14, wherein:
in said simulated passage forming step, a simulated passage member defining said simulated passage is constructed to be removable from said detection passage;
in said preliminary detection step, a change in a weight of the adhering gum substance is detected by measuring a weight of said simulated passage member; and
in said gum substance detecting step, the extent of adhesion of the gum substance onto said portion subject to gum substance monitoring is detected based on the change in weight thus detected in said preliminary detection step.

18. The gum substance detecting method according to claim 14, further comprising:
a first calibration detecting step of detecting extents of adhesion of the gum substance produced from said sample gas onto said simulated passage at time intervals during the supply of the fuel gas, prior to said preliminary detection step;
a second calibration detecting step of detecting an extent of adhesion of the gum substance onto said portion subject to gum substance monitoring corresponding to said simulated passage simultaneously with each of the detections by said first calibration detecting step; and
a data processing step of relating results of the detections by said first calibration detecting step to results of the detections by said second calibration detecting step and recording the results thus related to each other as reference detection data, wherein
in said gum substance detecting step, the extent of adhesion of the gum substance onto said portion subject to gum substance monitoring which corresponds to the extent of adhesion of the gum substance onto said simulated passage detected by said preliminary detection step is detected by using said reference detection data.

19. A gum substance detecting method comprising:
a detection passage preparing step of connecting a detection passage for allowing a part of a fuel gas as a sample gas to pass therethrough to a fuel gas supply passage configured to supply a combustor with the fuel gas;
a simulated passage forming step of forming in said detection passage a simulated passage for passage of the sample gas therethrough by simulating a fuel gas passage of said fuel gas supply passage extending in a portion subject to gum substance monitoring which is located downstream of a branch point at which said detection passage is branched from said fuel gas supply passage;
a preliminary detection step of detecting an extent of adhesion of a gum substance produced from the sample gas onto said simulated passage during supply of the fuel gas;

a first calibration detecting step of detecting extents of adhesion of the gum substance produced from the sample gas onto said simulated passage at time intervals during the supply of the fuel gas, prior to said preliminary detection step;

a third calibration detecting step of detecting a malfunction at said portion subject to gum substance monitoring corresponding to said simulated passage simultaneously with each of the detections by said first calibration detecting step;

a data processing step of relating results of the detections by said first calibration detecting step to results of the detections by said third calibration detecting step and recording the results thus related to each other as reference detection data; and a malfunction detecting step of detecting a malfunction at said portion subject to gum substance monitoring corresponding to said simulated passage, based on the extent of adhesion of the gum substance detected by said preliminary detection step.

* * * * *

UNITED STATES PATENT AND TRADEMARK OFFICE
CERTIFICATE OF CORRECTION

PATENT NO. : 8,499,620 B2  Page 1 of 1
APPLICATION NO. : 12/532827
DATED : August 6, 2013
INVENTOR(S) : Sako et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 981 days.

Signed and Sealed this
Fifteenth Day of September, 2015

Michelle K. Lee
*Director of the United States Patent and Trademark Office*